United States Patent [19]
Dietl et al.

[11] 3,859,310
[45] Jan. 7, 1975

[54] 6-OXO-2-METHYLHEPTANAL KETALS
[75] Inventors: Hans K. Dietl; Kent C. Brannock, both of Kingsport, Tenn.
[73] Assignee: Eastman Kodak Company, Rochester, N.Y.
[22] Filed: Aug. 23, 1972
[21] Appl. No.: 283,112

[52] U.S. Cl............ 260/340.9, 260/338, 260/340.7, 260/598, 260/599
[51] Int. Cl............................................ C07d 13/04
[58] Field of Search ..... 260/340.9, 338, 598, 340.7, 260/599, 602

[56] References Cited
OTHER PUBLICATIONS
Fieser & Fieser, Advanced Organic Chemistry, 1961, Reinhold, New York, pp. 441–443.

Weissberger, Heterocyclic Compounds, Part One, 1964, Interscience Publishers, New York, pp. 31–93 and 230–269.

*Primary Examiner*—Donald G. Daus
*Assistant Examiner*—James H. Turnipseed
*Attorney, Agent, or Firm*—John F. Stevens; George P. Chandler

[57] ABSTRACT

6-Oxo-2-methylheptanal ketals, intermediates in the synthesis of isophytol and their manufacture.

5 Claims, No Drawings

6-OXO-2-METHYLHEPTANAL KETALS

This invention relates to 6-Oxo-2-methylheptanal ketals which are intermediates in a process for the manufacture of isophytol and their manufacture.

In the synthesis of dl-tocopherols (i.e., Vitamin E), isophytol is reacted with trimethyl hydroquinone or dimethyl hydroquinone under acid conditions to form the desired product. See U.S. Pat. No. 2,411,969 of Karrer. Isophytol has also been found useful in the synthesis of Vitamin K. Isophytol has been prepared by reacting 2-methyl-6-keto-heptanal with geranyl halide in a Wittig reaction, the resulting product hydrogenated to phytone which is reacted with a vinyl Grignard reagent in water to produce isophytol. See Ichikawa and Kato, "Synthetic Studies of α-Tocopherol. III Synthesis of Phytone" *Bulletin of Chemical Society of Japan*, 41, 1232 (May, 1968).

In this reaction the key starting material is 2-methyl-6-keto-heptanal.

It has been found that 6-oxo-2-methylhaptanal ketals are simpler to use in the Wittig reaction than 2-methyl-6-keto-heptanal since the keto group is protected as the ketal. This leaves only the aldehyde group to react in the Wittig reaction.

In accordance with this invention, new compounds 6-oxo-2-methylheptanal ketals which are intermediates in a process for the synthesis of Vitamin E are disclosed as well as a process for their manufacture.

In the above compounds the ketal is selected from the groups alkyl, substituted or unsubstituted cycloalkyl, aryl, alkylene or substituted alkylene, the substituents may be lower alkyl, aryl or cycloalkyl groups.

By alkyl is meant any aliphatic hydrocarbon radical derived by dropping one hydrogen from an alkane and having from one to 10 carbon atoms. Alkylene means any aliphatic hydrocarbon radical derived by dropping two hydrogens from an alkane and having from two to four carbon atoms and lower alkyl substituted alkylene means any alkylene as defined above having two to four carbon atoms any of which may have a lower alkyl substituent. A cycloalkyl is a substituted or unsubstituted 5–7 carbon ring structive hydrocarbon. By lower alkyl is meant a hydrocarbon having from one to five carbon atoms. Aryl means a molecule having an aromatic nucleus at least one carbon of which has a lower alkyl substituent.

This compound can also be defined with reference to the following structural formula:

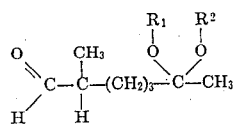

wherein $R^1$ and $R^2$ are either the same or different alkyl, cycloalkyl or aryl groups having one to 10 carbon atoms or $R^1$ and $R^2$ taken together are —A— wherein —A— is an alkylene group having two to four carbon atoms, or —A— is a lower alkyl (one to five carbon atoms), aryl or cycloalkyl substituted alkylene group having two to four carbon atoms. The ring formed when $R^1$ and $R^2$ are —A— has no more than seven members.

In preparing 6-oxo-2-methylheptanal alkyl ketal, 2-methyl-1-hepten-6-one prepared from isobutylene, acetone and formaldehyde as described in British Pat. No. 1,178,036 is reacted with an aliphatic alcohol having from one to 10 carbon atoms or a mixture of such alcohols in the presence of an acid catalyst. The product of this reaction is 2-methyl-1-hepten-6-one alkyl ketal which is then epoxidized by reaction with a peracid or peroxide. The resulting product is 1,2-epoxy-2-methyl-6-heptanone alkyl ketal. This epoxide is isomerized by methods described in the literature. See for example, Buehler and Pearson, *Survey of Organic Synthesis* (New York, 1970), p. 605; Weissberger, *Heterocyclic Compounds*, Part I, (New York, 1964), pp. 230–269. For example, the epoxy compound is refluxed in toluene in the presence of catalytic amounts of an alkali metal halide such as LiBr in a solvent such as hexamethyl phosphoric triamide. The product is 80 percent pure 6-oxo-2-methylheptanal alkyl ketal.

Suitable alcohols which can be utilized in this reaction include methanol, ethanol, n-propyl alcohol, isopropyl alcohol, n-butyl alcohol, sec-butyl alcohol, and other aliphatic alcohols up to and including decanol. These include also lower alkyl substituted aliphatic alcohols. Suitable acid catalysts include sulfo acids such as sulfuric, para-toluene sulfonic acid, ethanesulfonic acid and the like. However, other strong inorganic acids are also effective.

The compound 1,2-epoxy-2-methyl-6-heptanone alkyl ketal can also be prepared by reacting 2-methyl-1-hepten-6-one with ethyl orthoformate as described in Fieser and Fieser, *Advanced Organic Chemistry* (New York, 1961) p. 442.

6-Oxo-2-methylheptanal aryl ketal is prepared as described above except the alcohol or mixture of alcohols used include a ring compound having a lower alkyl substituent. Examples of such alcohols include benzyl alcohol, α-ethylbenzyl alcohol, ω-ethylbenzyl alcohol, benzylpropyl alcohol.

6-Oxo-2-methylheptanal cycloalkyl ketal is produced in the manner described above but utilizing a 5–7 carbon cyclo-alcohol such as cyclohexanol, cyclopentanol, cycloheptanol and these alcohols with alkyl substituents.

Mixtures of alkyl, aryl and cycloalkyl alcohols may also be used. The resulting compound can be an alkyl-aryl ketal and/or an alkyl-cycloalkyl ketal and/or an aryl-cycloalkyl ketal.

In forming the epoxide suitable peracids include perbenzoic, monoperphthalic, perpropionic, perbutyric, permonochloracetic, peracetic, performic, perisovaleric, percrotonic, diperoxalic, percamphoric, trifluoroperacetic, p-nitroperbenzoic, m-chloroperbenzoic acids. Epoxidation can also be achieved by the use of hydrogen peroxide.

6-Oxo-2-methylheptanal cyclic alkylene or lower alkyl substituted cyclic alkylene ketal is produced by reacting 2-methyl-1-hepten-6-one with a diol having from two to four carbon atoms or with a lower alkyl substituted diol having from two to four carbon atoms. The compound produced as a result of this reaction is 2-methyl-1-hepten-6-one cyclic alkylene or lower alkyl substituted cyclic alkylene ketal. This compound is reacted with a peracid or peroxide as described above. The resulting product is 1,2-epoxy-2-methyl-6-heptanone cyclic alkylene or lower alkyl substituted cyclic alkylene ketal which is refluxed in toluene with a halogenated alkali metal catalyst in hexamethyl phosphoric triamide as described above to produce the desired product.

Suitable glycols include ethylene glycol, 1,2-propylene glycol, 1,3-propylene glycol, 1,2-propylene glycol, 1,3-propylene glycol, 1,4-butylene glycol, and 2,3-butylene glycol and these glycols with lower alkyl, aryl or cycloalkyl substituents. Suitable peracids and peroxides are given above.

The formation of a ketal by the reaction of a ketone and an alcohol is known. See, for example, Fieser and Fieser, op. cit., pp. 441–443. The epoxidation of a compound at a double bond utilizing a peracid or a peroxide is also known. See Weissberger, *Heterocyclic Compounds*. Part 1 (New York, 1964) pp. 31–93.

The following examples are presented for a further understanding of the invention.

EXAMPLE 1

2-Methyl-1-hepten-6-one prepared from isobutylene, acetone and formaldehyde in accordance with British Pat. No. 1,178,036 (200 g.), ethylene glycol (400 g.), benzene (1500 ml.) and p-toluenesulfonic acid (0.03 g.) are heated to reflux with vigorous stirring. Water (24 ml.) is collected in a Dean-Stark trap over a period of 7 hours. The reaction mixture is poured into 1500 ml. water, the water layer washed with 200 ml. benzene, the organic layers combined, dried over $MgSO_4$ and filtered. Distillation of the resulting filtered product gives 2-methyl-1-hepten-6-one cyclic ethylene ketal (204 g. corresponding to a 78 percent yield) at 80–86°C., 110 mm. The 2-methyl-1-hepten-6-one cyclic ethylene ketal (200 g.) is dissolved in methylene chloride (800 ml.), sodium acetate (65 g.) is added, and the mixture cooled to 0°C. Peracetic acid (40 percent, 240 g.) containing sodium acetate (8 g.) is added with stirring over a period of 1 hour. The reaction mixture is allowed to warm to room temperature over a period of 4 hours, stirred for 1 hour at room temperature, and then poured into water. The organic layer is separated, dried over $MgSO_4$ and filtered. Distillation gives 1,2-epoxy-2-methyl-6-heptanone cyclic ethylene ketal (179 g., corresponding to a yield of 90 percent), having a boiling point of 76–78°C. at 1 mm. This epoxide is dissolved in 100 ml. toluene. Lithium bromide (2g.) and hexamethyl phosphoric triamide (2 g.) are added and the mixture refluxed for 12 hours. The reaction mixture is poured into water, the organic layer separated, dried over $MgSO_4$ and filtered. The solvent is distilled off at 1 mm. and the residue (50 g.) is 6-oxo-2-methylheptanal cyclic ethylene ketal (80 percent purity).

EXAMPLE 2

The exact procedure of Example 1 is repeated except one mole of m-chloroperbenzoic acid per mole of 2-methyl-1-hepten-6-one cyclic ethylene ketal is used instead of peracetic acid and no sodium acetate is utilized.

EXAMPLE 3

The exact procedure of Example 1 is repeated except 1,2-propanediol is used instead of ethylene glycol. The product is 6-oxo-2-methylheptanal cyclic methylethylene ketal.

EXAMPLE 4

The exact procedure of Example 1 is repeated except n-propyl alcohol is used instead of ethylene glycol. The product is 6-oxo-2-methylheptanal dipropyl ketal.

EXAMPLE 5

The exact procedure of Example 1 is repeated except benzyl alcohol is used instead of ethylene glycol. The product is 6-oxo-2-methylheptanal dibenzyl ketal.

EXAMPLE 6

The exact procedure of Example 1 is repeated except cyclohexanol is used instead of ethylene glycol. The product is 6-oxo-2-methylheptanal dicyclohexyl ketal.

EXAMPLE 7

The exact procedure of Example 1 is repeated except a mixture of n-propyl alcohol with n-butyl alcohol is used instead of ethylene glycol. The product is a mixture of 6-oxo-2-methylheptanal propyl ketal 6-oxo-2-methylheptanal propyl butyl ketal, and 6-oxo-2-methylheptanal butyl ketal.

As described by Ichikawa and Kato, op. cit., p. 1232, 6-oxo-2-methylheptanal as an intermediate in the synthesis of Vitamin E can be prepared from 1,3-dimethyl-1-cyclohexene by ozonalysis and reductive decomposition. One would expect 6-oxo-2-methylheptanal could also be prepared by epoxidizing 2-methyl-1-hepten-6-one by reaction with peracetic acid. The epoxide could then be isomerized to 6-oxo-2-methylheptanal by known methods such as a reaction with alkali metal halide. However it has been unexpectedly found that the aldehyde is not produced when this process is used but rather a cyclic compound results, namely 6,8-dioxabicyclo [3.2.1] octane.

In accordance with this invention, however, there is disclosed a process for making 6-oxo-2-methylheptanal ketal using 2-methyl-1-hepten-6-one as a starting material. This ketal is an effective intermediate in the manufacture of Vitamin E. It is simpler to use in the Wittig reaction since the keto group is protected as the ketal.

Disclosed herein are new compounds 6-oxo-2-methylheptanal ketals including alkyl, aryl, cyclic alkylene, lower alkyl substituted cyclic or cycloalkyl alkylene ketals. These compounds are valuable intermediates in the production of phytol and isophytol which are reactants in the synthesis of dl-tocopherols, i.e., vitamin E.

Although the invention has been described in considerable detail with particular reference to certain preferred embodiments thereof, variations and modifications can be effected within the spirit and scope of the invention.

I claim:

1. A ketal having the formula

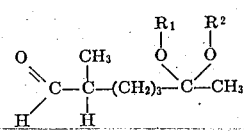

wherein $R^1$ and $R^2$ are the same or different alkyl having one to 10 carbon atoms, cycloalkyl having five to seven carbon ring structure or phenyl one carbon atom of which has an alkyl having one to five carbon atoms; or $R^1$ and $R^2$ taken together are —A— wherein —A— is alkylene having two to four carbon atoms or alkylene having two to four carbon atoms substituted with alkyl having one to five carbon atoms, cycloalkyl having a 5–7 carbon ring structure or phenyl one carbon atom of which is substituted with alkyl having one to five carbon atoms.

2. A ketal according to claim 1 wherein $R^1$ and $R^2$ are —A— and the ring formed thereby has no more than 7 members.

3. 6-Oxo-2-methylheptanal cyclic ethylene ketal having the formula

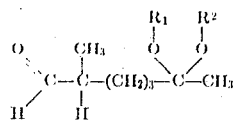

4. 6-Oxo-2-methylheptanal cyclic methylethylene ketal.

5. 6-Oxo-2-methylheptanal dipropyl ketal.

* * * * *

PO-1050
(5/69)

UNITED STATES PATENT OFFICE
CERTIFICATE OF CORRECTION

Patent No. __3,859,310__  Dated __January 7, 1975__

Inventor(s) __Hans K. Dietl and Kent C. Brannock__

It is certified that error appears in the above-identified patent and that said Letters Patent are hereby corrected as shown below:

In Claim 3, column 6, delete the formula and insert

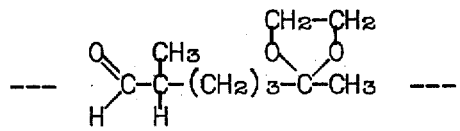

Signed and sealed this 18th day of March 1975.

(SEAL)
Attest:

RUTH C. MASON
Attesting Officer

C. MARSHALL DANN
Commissioner of Patents
and Trademarks